United States Patent Office 3,257,919
Patented June 28, 1966

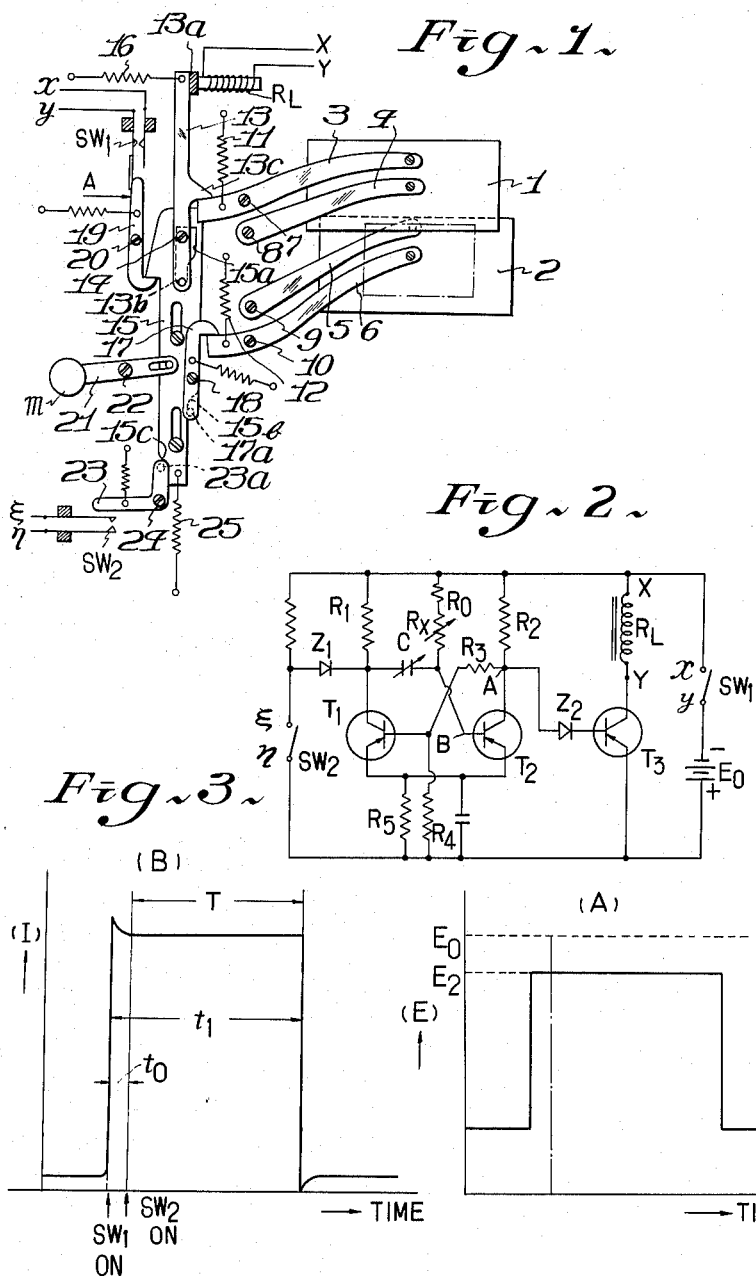

3,257,919
PHOTOGRAPHIC SHUTTER WITH AUTOMATIC CONTROL MEANS FOR EXPOSURE TIME
Takayoshi Sato, Itabashi-ku, Tokyo-to, and Tomio Kikuchi, Toshima-ku, Tokyo-to, Japan, assignors to Copal Co., Ltd., Tokyo-to, Japan, a joint-stock company of Japan
Filed Apr. 3, 1963, Ser. No. 270,292
Claims priority, application Japan, Apr. 9, 1962, 37/13,528
2 Claims. (Cl. 95—10)

The present invention relates to photographic shutters and more particularly to a photographic shutter in which the exposure time is automatically controlled by means of an electric delay means, including a photoconductive element, and actuated by the shutter releasing operation.

In automatic photographic cameras there are two well known types. In one of these types, one of the exposure factors (either the diaphragm aperture or the exposure time) is set previously by hand, and the other of said exposure factors is set automatically by the shutter release operation. In the other type, both of said exposure factors are set together automatically by the shutter release operation. The camera based on the present invention relates to the type in which the exposure time is set automatically by the shutter release operation after the previous setting of the diaphragm aperture adjusting means by hand.

Generally, in such shutter devices adapted for the cameras of the aforementioned type the exposure time is set, at the first period of the shutter release operation, by means of a mechanical exposure time control means (i.e., the so-called "slow governor") according to the deflection of a galvanometer. However, in such a mechanical system, if the brightness of an object varies during shutter opening, the exposure time cannot vary according to such variation. Moreover, such cameras provided with exposure meters, which have very delicate mechanical and/or electrical operation, are of very difficult and complicated design and assemblage. In contrast, the camera of the present invention has an electric delay device comprising an electric source, an electromagnet, a photoconductive element the ohmic resistance of which is varied according to the brightness of the object being photographed, a variable capacitor having an electric capacitance varying according to the diaphragm aperture or the film speed, and the transistors used as an electric switch when the shutter is released, with said electric delay device controlling the time during which said electromagnet electro-magnetically maintains the latch member engaged with the shutter closing means.

Accordingly, an object of the present invention is to provide a photographic camera provided with an automatic exposure time control means without the aforesaid slow governor and exposure meter.

Another object of the present invention is to provide a photographic camera in which, when the brightness of an object being photographed is varied during exposure on the film, the exposure time is always controlled automatically to be of a suitable value, whereby long time exposure is performed very efficiently.

Still another object of the present invention is to provide a photographic camera such that, when the shutter is released, the functioning period of said electromagnet maintaining the latch member in its state of stopping the shutter closing action is controlled by means of the aforesaid electric circuit varying the delaying time according to the brightness of the object being photographed.

A further object of the present invention is to provide a focal plane shutter provided with the automatic exposure time control means as above mentioned.

Other objects of the present invention will be easily understood from the following description, when taken in conjunction with the accompanying drawings, wherein:

FIG. 1 is an elevational view showing the principal parts of a focal plane shutter according to the invention in the cocked position;

FIG. 2 is a connection diagram of an electric time delay circuit in accordance with the present invention;

(A) of FIG. 3 is graph showing the relationship between the time and the voltage at the point A of FIG. 2; and (B) of FIG. 3 is graph showing the relationship between the time and the current which flows between the terminals X and Y.

In the circuit shown diagramatically in FIG. 2, transistors $T_1$, $T_2$, and $T_3$ are respectively connected in parallel to an electric batter $E_0$. An ohmic resistance $R_1$ is inserted between the collector of said transistor $T_1$ and said electric battery $E_0$, an ohmic resistance $R_2$ is inserted between the collector of said transistor $T_2$ and said electric battery $E_0$, and an electromagnet $R_L$ is inserted between the terminals XY between the collector of said transistor $T_3$ and said electric battery $E_0$. The base plate of said transistor $T_1$ is connected through an ohmic resistance $R_3$ to the collector of said transistor $T_2$ and is connected through an ohmic resistance $R_4$ to the electric battery $E_0$. The base plate of said transistor $T_2$ is connected through a photoconductive element $R_x$, the ohmic resistance value of which varies according to the brightness of the object being photographed, to the electric battery $E_0$, and through a variable capacitor C, the capacitance of which is varied according to the diaphragm aperture or the film speed, to the collector of said transistor $T_1$. A supplementary ohmic resistance $R_0$ is connected to said photoconductive element $R_x$ in series. The emitters of said transistors $T_1$ and $T_2$ are connected through a common ohmic resistance $R_5$ and a capacitor to said electric battery $E_0$. The base plate of said transistor $T_3$ is connected through a Zener diode $Z_2$ to the collector of said transistor $T_2$. A first switch $SW_1$ including terminals x and y is connected in series to said electric battery $E_0$. A second switch $SW_2$ includes terminal $\xi$, $\eta$, one of which is connected through a diode $Z_1$ to the collector of said transistor $T_1$, and the other of which is connected through the ohmic resistance $R_5$ to the emitter of said transistor $T_1$.

When the first switch $SW_1$ is closed, the transistor $T_2$ is biased negatively through the photoconductive element $R_x$ and an ohmic resistance $R_0$, and in the transistor $T_2$, a collector current $IC_2$ flows through the ohmic resistance $R_2$. Accordingly, the electric potential at the point A in FIG. 2 is maintained at $E_1$ ($\doteq E_0 - R_2IC_2$) indicated in FIG. 3. In this state, the electric potential of the base plate of the transistor $T_1$ is maintained at a value which results from the division of the electric potential $E_1$ at the point A by the ohmic resistances $R_5$ and $R_4$ (strictly speaking, including the ohmic resistance $R_5$ and the internal resistance of the transistor $T_1$). This base potential becomes a higher positive potential than the emitter voltage of the transistor $T_2$ generated by the flow of the emitter current of the transistor $T_2$ through the ohmic resistance $R_5$. Accordingly, the transistor $T_2$ assumes a positively biased state, and an emitter current does not flow in the transistor $T_1$ (cut-off state).

Then, when the second switch $SW_2$ is closed, electric current flows through the electric capacitor C and the photoconductive element $R_x$. Accordingly, the base potential $E_b$ of the transistor $T_2$ varies according to the time constant determined by the resistance value of the photoconductive element $R_x$ and the capacitance of the capacitor C, and the transistor $T_2$ is placed in the cut-off state from the moment when the second switch $SW_2$ is closed.

On the other hand, since the electric potential at the point A simultaneously increases toward negative potential, the transistor $T_1$ is brought into the conductive state. Such a state, wherein the transistor $T_1$ is conductive and the transistor $T_2$ is cut off, is continued until the electric potential $E_b$ of the point B becomes equal to or higher than the common emitter potential $E_e$ of the transistors $T_1$ and $T_2$. Then, the transistor $T_2$ assumes the active state again, and the transistor $T_1$ returns to the cut-off state. In this case, the time period $t_1$ from the closing of the second switch $SW_2$ to the return to the initial state is equal to $K(R_x+R_0)C$, wherein K is a constant determined by the voltage of the electric source and other ohmic resistances. If a suitable resistance is inserted between the point A and the base plate of the transistor $T_3$, the output current from the transistor $T_3$ as shown at (B) of FIG. 3 will flow through the electromagnet $R_L$ only during a time period $t_1$ after closing of the second switch $SW_2$. In FIG. 2, in place of the above mentioned resistance, there is used a Zener diode $Z_2$ which can magnify very effectively the switching ratio of the transistor $T_3$.

Next, an embodiment in which the above mentioned special circuit is coupled to a photographic focal plane shutter will be described. In FIG. 1, a second shutter blade 1 is supported as a link of a four-bar linkage on driving members 3 and 4. In the same manner, a first shutter blade 2 is supported on driving members 5 and 6. Said driving members 3, 4, 5, and 6 are rotatably pivoted on axes 7, 8, 9, and 10, respectively and the driving members 3 and 6 are respectively provided with driving sources 11 and 12. A latching member 13 for unlatching the tensioned driving member 3 is rotatably pivoted on an axis 14. One end of said member 13 is provided with a ferro-magnetic plate 13a cooperating with the electromagnet $R_L$, and on the other end is fixed a pin 13b engaging with a cam face 15a formed on a releasing plate 15. Moreover, on said member 13 there is formed a latch portion 13c for engaging the driving member 3. The member 13 is subjected to a force in the anticlockwise direction by a spring 16 exerting a force which is less than the attractive force of the electromagnet $R_L$. An axis 18 pivotally supports a first latching member 17 having a pin 17a engaged with a cam face 15b formed on the releasing plate 15. An axis 20 pivotally supports a release lever 19 for unlatching the tensioned releasing plate 15. The first switch $SW_1$ is constructed so as to close immediately when said release lever 19 is rotated in the clockwise direction. The releasing plate 15 is released after closing of the first switch $SW_1$. An axis 22 pivotally supports an inertia member 21 having a mass M and regulates the motion of the releasing plate 15. An axis 24 pivotally supports a crank lever 23 for closing the second switch $SW_2$. A pin 23a fixed on said crank lever 23 engages with a cam face 15c formed on the releasing plate 15. A spring 25 is provided for actuating the releasing plate 15. The terminals XY, xy, and $\xi\eta$ shown in FIG. 2 respectively correspond to the reference letters XY, xy, and $\xi\eta$ shown in FIG. 1.

In FIG. 1, when the release lever 19 is pushed in the direction shown by the arrow A, the first switch $SW_1$ is first closed, and only the transistor $T_2$ is brought into the conductive state as aforementioned. Next, the releasing plate 15 is moved downwardly by the force of the spring 25, and the cam 15c formed on the releasing plate 15 pushes the pin 23a fixed on the crank lever 23 in the anticlockwise direction. By said movement of the crank lever 23, the second switch $SW_2$ is closed. As the transistor $T_2$ assumes the conductive state upon the closing of said switch $SW_2$, a large current is supplied to the electromagnet $R_L$. Accordingly, said electromagnet $R_L$, operating against the force of the spring 16, maintains the ferromagnetic plate 13a in the attracted state during the time when the said large current is being supplied to the electromagnet $R_L$. On the other hand, at the same time, the cam 15b on the releasing plate 15 pushes the pin 17a fixed on the first latching member 17 in the anticlockwise direction. Accordingly, since the first latching member 17 is disengaged from the first driving member 6, the first shutter blade 2 is opened. In this case, the cam 15b of the releasing plate 15 and the pin 17a of the first latching member 17 are positioned in such a manner that the first shutter blade begins to move for opening after a relatively short time $t_0$ from the closing of the second switch $SW_2$ as shown in FIG. 1. After the elapse of the time period $t_1$ which is determined by both the variable capacitor C, the photoconductive element $R_x$ and the supplementary ohmic resistance $R_0$, since the transistor $T_3$ assumes the cut-off state, the current which is supplied to the electromagnet $R_L$ decreases abruptly. Accordingly, as the ferromagnetic plate 13a is returned in the anticlockwise direction by the force of the spring 16, the latching portion 13c of the second latching member 13 disengages from the second shutter blade driving member 3, whereby the shutter closing operation begins. Since the time period $t_1$ during which the transistor $T_3$ is in the conductive state is equal to $KC(R_x+R_0)$, the shutter exposure time can be controlled continuously at will by causing the said variable capacitor C to correspond to the adjusting element of the diaphragm aperture and film speed, etc., that is, the true exposure time T is given by the following equation.

$$T = t_1 - t_0 \\ = KC(R_x + R_0) - KCR_0 \\ = KCR_x$$

Accordingly, said exposure time T can be controlled over a very wide range by the variation of the resistance value of the photoconductive element $R_x$.

We claim:
1. In a camera provided with a device for automatically controlling the exposure time, said device including first and second shutter blades constituting a shutter assembly, a first shutter blade driving means for moving the first shutter blade from closed position to opened position by camera release operation, a second shutter blade driving means for moving the second shutter blade from closed position to opened position by camera release operation, first and second latch means operably related to the first and second shutter blade driving means for latching the first and second shutter blade driving means, respectively, in the cocked position of the shutter assembly, spring means biasing the second latch means for disengaging the second latch means from the second shutter driving means, electro-magnetic means cooperating with the second latch means for maintaining the second latch means in latching position at the shutter assembly releasing time against the action of the spring means by the magnetic attraction of the electromagnetic means, shutter assembly release means movable to the shutter assembly cocking position by a manual cocking operation, second spring means operably coupled to the shutter assembly release means for moving the release means in shutter assembly releasing direction, the release means causing the second latch means to contact the electro-magnetic means against the action of the first mentioned spring means by the movement of the release means to the shutter assembly cocking position and causing the first driving means to disengage from the first latch means by the movement of the release means in the releasing direction, a release lever operably related to the shutter assembly release means for retaining the release means in the shutter assembly cocking position and for releasing the release means by camera release operation, an electric circuit having a transistor switching circuit including a photo-conductive element and a capacitor as a C-R circuit for establishing the exposure time in response to the brightness of the object to be photographed, a solenoid for the electro-magnetic means, a normally opened first switch means for energizing the circuit when closed prior to the release means being released from the release lever, a normally opened second switch means for initiating the timing operation of the circuit when closed, and means for closing the second switch means according to the movement of the release means slightly prior to the shutter assembly being released.

2. The device as claimed in claim 1 including an inertia member operably connected to the release means for regulating the motion thereof.

References Cited by the Examiner
UNITED STATES PATENTS

| | | | |
|---|---|---|---|
| 2,179,717 | 11/1939 | Fedotoff | 95—60 |
| 2,927,519 | 3/1960 | Mastsuda | 95—55 |
| 2,975,689 | 3/1961 | Chatini | 95—55 X |
| 2,978,970 | 4/1961 | Fahlenberg | 95—53.3 X |
| 3,020,816 | 2/1962 | Frenk | 95—53 |
| 3,063,354 | 11/1962 | Matulik | 95—10 |
| 3,078,778 | 2/1963 | Okabe | 95—55 |
| 3,205,795 | 9/1965 | Grey | 95—10 |

NORTON ANSHER, *Primary Examiner.*

W. E. JACKSON, J. F. PETERS, *Assistant Examiners.*